Dec. 6, 1938.   J. J. JAKOSKY   2,138,818
METHOD OF DETERMINING UNDERGROUND STRUCTURE
Original Filed March 23, 1935

INVENTOR.
JOHN JAY JAKOSKY,
BY
ATTORNEYS.

Patented Dec. 6, 1938

2,138,818

UNITED STATES PATENT OFFICE 2,138,818

METHOD OF DETERMINING UNDERGROUND STRUCTURE

John Jay Jakosky, Los Angeles, Calif.

Original application March 23, 1935, Serial No. 12,640. Divided and this application November 20, 1937, Serial No. 175,666

3 Claims. (Cl. 175—182)

This invention relates to the study of underground structure by means of electrical observations made at the earth's surface. Particularly it refers to the detection, location and correlation of inhomogeneities in the earth's subsurface by means of measurements of the earth's electrical conductivity made at the surface of the ground.

More specifically, this invention comprises improvements over the methods at present practiced in measuring the electrical conductivity (or the related quantity, electrical resistance) of materials in place below the earth's surface, and, further, includes improvements in the mode of utilizing the data thus obtained in order to derive information concerning underground structure. By virtue of these improvements the desired information may be more readily and accurately obtained, with a saving in the time required in making measurements in the field and in reaching conclusions as to the existence, location and correlation of subsurface inhomogeneities.

This application is a division of my copending application Serial No. 12,640, filed March 23, 1935.

Present methods of using current passed into the ground as a basis for determinations of subsurface structure express the experimental results in terms of electrical resistivity of the subsurface materials. The improvements herein described are more directly and conveniently expressed in terms of specific conductance, which is related to specific resistivity by the well known formula, $C_c = 1/\rho_c$, where $C_c$ represents specific conductance and $\rho_c$ specific resistivity.

In present methods of measuring the resistivity of earth materials in place, a flow of direct or alternating current is produced in the subsurface, usually by making connection to the earth's surface at two points, and passing a current through the circuit comprising the two points, the earth and the connectors from said points to the power supply. While current is passing, measurement is made of the potential existing between two auxiliary or potential electrodes having a known spacial relationship with the two current or power electrodes. Knowing (1) the electrode spacing, (2) the current flowing between the two current electrodes, and (3) the potential existing between the two auxiliary or potential electrodes all at some given instant, calculations are made which give resistivity (or conductivity) of the subsurface materials included by the measurements.

Figure 1:
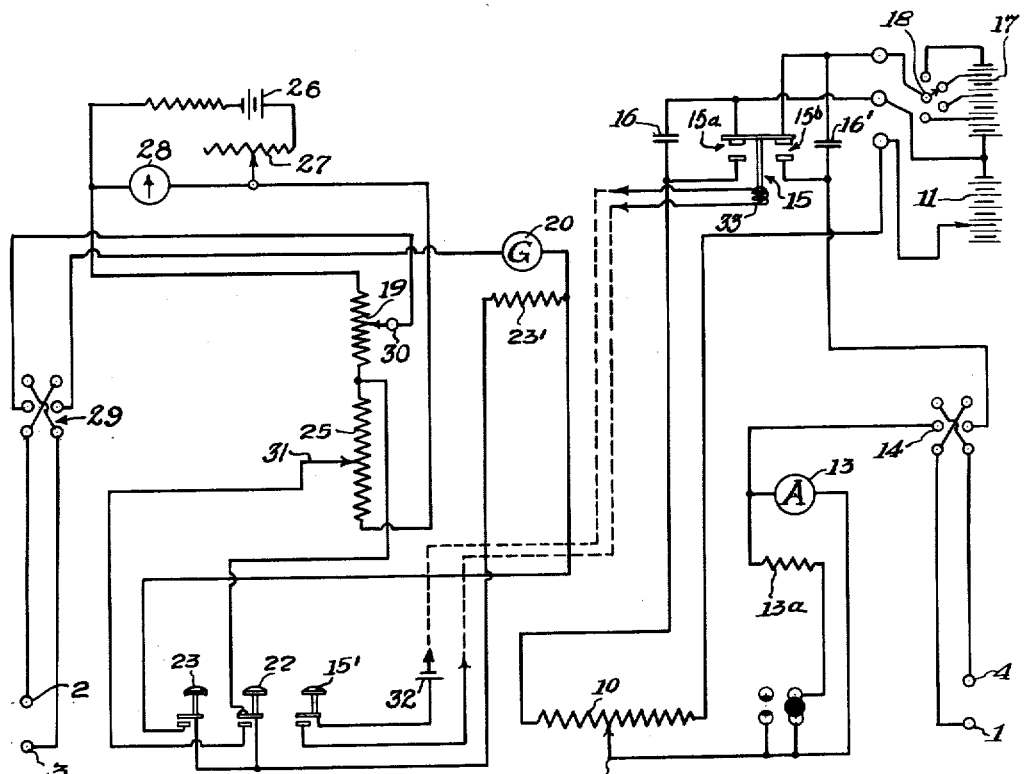
Figures 2, 3:
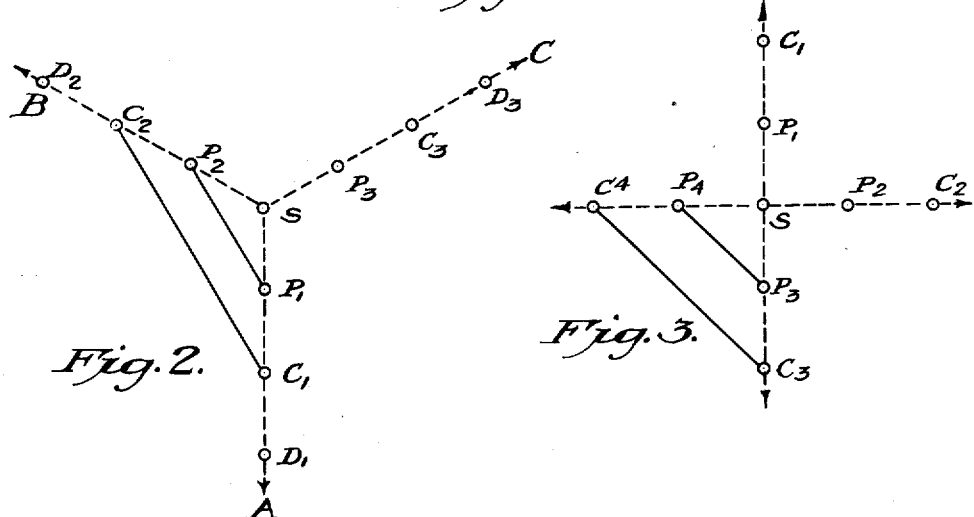

The several figures accompanying this description are as follows:

Fig. 1 is a diagrammatic drawing of one form of apparatus for use in the improved method of determining the resistance of earth materials as disclosed in the present application;

Fig. 2 illustrates a method of laying out the lines of survey at an electrical survey station by which three separate conductivity readings may be taken at each setting of electrodes, using the improved apparatus disclosed herein, with a resulting improvement in accuracy and certainty of interpretation over methods at present in use; and Fig. 3 illustrates a similar method of laying out the lines of survey by which six separate readings of conductivity may be taken at each setting of the electrodes.

Referring to Fig. 1, a current controlling potentiometer 10 is connected across a battery 11, and is provided with a contactor 12, whereby a unidirection potential, with its resultant unidirectional current flow, may be impressed across two current electrodes such as indicated at 1 and 4 upon closing electromagnetically operated switch 15 in circuit therewith. In this manner any current value within the range of the battery 11 may be obtained merely by varying the position of the contactor 12. An ammeter 13 having a suitable shunt 13a is provided for measuring the flow of current in this circuit and through the earth between the current electrodes 1 and 4. A reversing switch 14 is connected in circuit with the current electrodes in order that the electrode 1, or 4, may be positive or negative as desired. It will be noted from the wiring diagram that when the potential obtained from potentiometer 10 is insufficient to cause the desired current flow between electrodes 1 and 4, this potential may be augmented by the supplementary battery 17 to which connection is made by the multiple-point switch 18. Switch 18 therefore gives rough adjustments of the current, in steps depending upon the number of batteries connected between each point on the switch, while the potentiometer 10 with its contactor 12 allows very accurate control of the current. It will of course be understood that any other form of power supply, capable of accurate control, may be employed.

When electromagnetically operated switch 15 is closed, closing the pairs of contacts 15a and 15b, connection is established from either one of the electrodes 1 or 4 from one side of reversing switch 14 through ammeter 13, variable tap 12, a desired portion of potentiometer 10, and contacts 15a to a connection between batteries 11 and 17. The circuit between the electrodes is then completed from this connection between the batteries, through a desired portion of battery 17, switch 18, and contacts 15b to the other side of reversing switch 14.

The unidirectional potential existing between two potential electrodes such as indicated at 2 and 3 may be measured by means of a conventional potentiometer such as shown at 25. In practice of this invention however, I may also employ a potentiometer 19 in order to determine or to neutralize the normal ground potential existing between electrodes 2 and 3. The potentiometers 19 and 25 are shown connected serially in an electric circuit including a battery 26 which supplies the current to produce the desired voltage drop across said potentiometers. A rheostat 27 is provided for adjusting the current in said potentiometer circuit to give the desired value of potential across said potentiometers, the value of which potential may be indicated by voltmeter 28.

As a first step in the measurement of earth resistance, the potentiometer 19 is adjusted to give a reading, preferably zero, on galvanometer 20. The electrodes 2 and 3 are normally in circuit with potentiometer 19 through a reversing switch 29. One side of the reversing switch 29 is connected to adjustable tap 30 of the potentiometer 19, while the other side of said switch is connected through the galvanometer 20, series resistor 23', and push-button switch 22, which is shown in its normal "up" position, to a point intermediate potentiometers 19 and 25. By means of push-button switch 22, any desired additional potential may be thrown into the circuit 2—3, by cutting in a variable portion of the potentiometer 25.

Upon depressing push-button 22, connection of the galvanometer 20 with the point intermediate the potentiometers 19 and 25 is broken and the galvanometer is connected through the "down" contact of switch 22 to the variable tap 31 of potentiometer 25. This introduces any desired portion of the potential available across the potentiometer 25, depending upon the position of the tap 31, in series with the potential already supplied by the potentiometer 19, in circuit with the electrodes 2 and 3. Push-button 23 is provided for shunting out series resistor 23' which is normally in circuit with the galvanometer 20, so as to increase the sensitivity of the galvanometer when final measurements are being made.

Push-button 15' is connected in circuit with a battery 32 and actuating coil 33 of the electromagnetically operated current switch 15 in the power circuit. Depressing switch 15' closes the circuit of coil 33 and acts to close the energizing circuit through contactor 15. The contacts of contactor 15 are shunted by condensors 16 and 16' which is according to common practice.

Assuming that the apparatus has been connected to current and potential electrodes, the operator adjusts the neutralizing potentiometer 19 until an approximate balance is indicated by the galvanometer 20. The push-button 23 is then depressed, resulting in greater sensitivity of the galvanometer and the final balance is obtained. These operations serve to balance out the natural earth potential. Push-button 22 is next depressed, which automatically introduces the variable additional potential of potentiometer 25 in the potential or pick-up circuit. Simultaneously with the depressing of push-button 22, the operator may depress the push-button 15' to start the flow of current.

The circuit above described provides a convenient means for accurately measuring the relation of the current passed through the earth between two current electrodes, to the potential created between two potential electrodes by the passage of said current. For example, the potentiometer 10 in the supply circuit may be adjusted to provide any desired value of current between electrodes 1 and 4, and the potential between electrodes 2 and 3 may be measured by noting the position of adjustment of the variable potentiometer 25 required to balance the galvanometer 20; or the potentiometer 25 may be adjusted to a desired value of potential, the current in the supply circuit adjusted until the galvanometer 20 is balanced, and the current measured at 13. A rough adjustment may be made with the buttons 15' and 22 depressed, and a final adjustment may be made by additionally depressing button 23.

The quantity of field data at present obtainable within an allotted time for a given survey is definitely limited by the time necessarily consumed in instrumental readings and set aside for calculation and plotting of results. For accurate work it is essential that current be passed through the ground in more than one azimuthal direction in order to eliminate the effects introduced by uneven topography and by strike and dip of the beds. In order to evaluate such effects when using conventional methods, it is necessary to run two or three depth-resistivity sections at each station, preferably at 90° or 120° azimuthal separation respectively, which nearly doubles or trebles the time devoted to each station, or divides the number of stations which can be run in a given time by nearly two or three. For economic reasons the time devoted to each survey is usually prescribed, and in practice single sections are customarily run at each station with resulting inaccuracies, or even major errors, in the final interpretation of results.

By a method which I have evolved, multiple sections can be obtained at each station in no longer time than at present required for single sections. The preferred field procedure consists in laying out at a given station S three radiating lines at angles of 120° as shown in Fig. 2. Beginning at the point S a selected distance is repeatedly measured off along each line, as for instance the distances S—$P_1$, $P_1$—$C_1$, $C_1$—$D_1$, etc., as many times as desired along line A; the same repeated distance S—$P_2$, $P_2$—$C_2$, $C_2$—$D_2$, etc., along line B; and similarly along line C. Current electrodes are placed in the ground at three points equidistant from S on the three lines, as at $C_1$, $C_2$ and $C_3$, and are connected with a switchboard located at the instrument so that any two electrodes may be connected to the power supply and the current measuring instrument, after the manner of the current electrodes 1 and 4 in Fig. 1. Similarly three potential electrodes are placed equidistantly from S on the three lines, as at $P_1$, $P_2$ and $P_3$, and connected through a similar instrument switch for connecting any two of them to the potential apparatus, after the manner of the potential electrodes 2 and 3 in Fig. 1. It is usually desirable to employ non-polarizing electrodes for the potential electrodes. The three potential electrodes may be nearer to or farther from S than the current electrodes. Operators are stationed at the six electrodes to extend the wires and move the electrodes to new points as each set of readings is completed.

A set of readings consists, for example, in measuring and plotting the relation of the current passed into the ground between $C_1$ and $C_2$ and potential existing between $P_1$ and $P_2$; switching to electrodes $C_2$, $C_3$, $P_2$ and $P_3$ and similarly measuring and plotting this relation; and finally switching to electrodes $C_3$, $C_1$, $P_3$ and $P_1$ and again similarly measuring and plotting this relation. In this way three complete measurements at different azimuths are made for each electrode spacing as measured from the point S.

When measurements are made in this manner irregularities in the plotted curves due to rough topography or to dip of stratified layers may be detected by comparison of the three plots, and may be eliminated in interpretation of the results. It is important to note that the measurements are made around the station S, and at a distance therefrom which increases with the electrode separation. This particular distribution of current and potential results in greater accuracy than can be obtained either by using a single electrode at S and plotting equipotential lines about that point, or by plotting numerous resistivity sections passing through the point S.

An alternative arrangement which allows greater detail and which also gives the desired distribution of current lines about and equidistant from point S is illustrated in Fig. 3. This arrangement consists in running four lines 90° apart from the point S, and marking out equidistant stations along these lines. The four current electrodes $C_1$, $C_2$, $C_3$ and $C_4$ taken two at a time allow six combinations, to each of which corresponds a similar pair of potential electrodes whose positions are indicated at $P_1$, $P_2$, $P_3$ and $P_4$. Six separate plotted curves may therefore be made for each station, greatly increasing the accuracy of interpretation.

It will be understood that, when using either of the multiple section methods illustrated in Figs. 2 and 3, a series of measurements is made with various electrode spacings along the several traverse lines radiating from the common point S, and that the relative spacings of the several current and potential electrodes from point S may, if desired, be maintained uniform for all these measurements. The measurements thus obtained may be interpreted to give the desired information, for example, by calculation of $\rho_a$ or $C_c$, by suitable equations. In this connection, it is important to note that the interpretation of the data obtained is in any case primarily dependent upon the comparative shape of the curves obtained from several series of measurements, and upon the relative position of the significant changes in slope of these curves.

The presence of four electrodes besides the two current electrodes in use at any instant, as shown in Fig. 2, all electrodes being connected by wires to the instrument, makes it possible, by retaining one of the four as a fixed potential electrode and successively connecting each of the remaining three as the second potential electrode, to determine relative potentials at four points for each setting of current electrodes. The additional information as to distribution of potential at the surface is of value in correcting final data for topography and dip of strata. An additional electrode at the center S makes another potential reading possible, and this electrode needs no moving throughout the series of observations. Still more complete mapping of the potential field at the surface is accomplished by the electrode arrangement represented in Fig. 3, following the general procedure just described.

I claim:

1. In a method of determining discontinuities in the materials below the earth's surface, the steps which comprise laying out more than two angularly spaced lines radiating from a common point on the earth's surface; placing grounded potential electrodes at points on each of said lines equidistant from said common point; placing grounded current electrodes at points on each of said lines equidistant from said common point but spaced from the locations of the potential electrodes; passing current through the earth between the two current electrodes located on two of said lines to produce a potential difference between the two potential electrodes located on said two lines, and determining the relation of said current to said potential; and subsequently passing current through the earth between the current electrode located on one of said two lines and the curved electrode located on a third one of said lines to produce a potential difference between the two potential electrodes located on the last-mentioned two lines, and determining the relation of the last-mentioned current to the last-mentioned potential.

2. The invention as set forth in claim 1, in which said lines radiating from a common point comprise three lines spaced 120° apart.

3. The invention as set forth in claim 1, in which said lines radiating from a common point comprise four lines spaced 90° apart.

JOHN JAY JAKOSKY.

---

CERTIFICATE OF CORRECTION.

Patent No. 2,138,818.                      December 6, 1938.

JOHN JAY JAKOSKY.

It is hereby certified that error appears in the printed specification of the above numbered patent requiring correction as follows: Page 3, second column, line 39, claim 1, for the word "curved" read current; and that the said Letters Patent should be read with this correction therein that the same may conform to the record of the case in the Patent Office.

Signed and sealed this 31st day of January, A. D. 1939.

Henry Van Arsdale (Seal)                      Acting Commissioner of Patents.

to electrodes $C_2$, $C_3$, $P_2$ and $P_3$ and similarly measuring and plotting this relation; and finally switching to electrodes $C_3$, $C_1$, $P_3$ and $P_1$ and again similarly measuring and plotting this relation. In this way three complete measurements at different azimuths are made for each electrode spacing as measured from the point S.

When measurements are made in this manner irregularities in the plotted curves due to rough topography or to dip of stratified layers may be detected by comparison of the three plots, and may be eliminated in interpretation of the results. It is important to note that the measurements are made around the station S, and at a distance therefrom which increases with the electrode separation. This particular distribution of current and potential results in greater accuracy than can be obtained either by using a single electrode at S and plotting equipotential lines about that point, or by plotting numerous resistivity sections passing through the point S.

An alternative arrangement which allows greater detail and which also gives the desired distribution of current lines about and equidistant from point S is illustrated in Fig. 3. This arrangement consists in running four lines 90° apart from the point S, and marking out equidistant stations along these lines. The four current electrodes $C_1$, $C_2$, $C_3$ and $C_4$ taken two at a time allow six combinations, to each of which corresponds a similar pair of potential electrodes whose positions are indicated at $P_1$, $P_2$, $P_3$ and $P_4$. Six separate plotted curves may therefore be made for each station, greatly increasing the accuracy of interpretation.

It will be understood that, when using either of the multiple section methods illustrated in Figs. 2 and 3, a series of measurements is made with various electrode spacings along the several traverse lines radiating from the common point S, and that the relative spacings of the several current and potential electrodes from point S may, if desired, be maintained uniform for all these measurements. The measurements thus obtained may be interpreted to give the desired information, for example, by calculation of $\rho_a$ or $C_c$, by suitable equations. In this connection, it is important to note that the interpretation of the data obtained is in any case primarily dependent upon the comparative shape of the curves obtained from several series of measurements, and upon the relative position of the significant changes in slope of these curves.

The presence of four electrodes besides the two current electrodes in use at any instant, as shown in Fig. 2, all electrodes being connected by wires to the instrument, makes it possible, by retaining one of the four as a fixed potential electrode and successively connecting each of the remaining three as the second potential electrode, to determine relative potentials at four points for each setting of current electrodes. The additional information as to distribution of potential at the surface is of value in correcting final data for topography and dip of strata. An additional electrode at the center S makes another potential reading possible, and this electrode needs no moving throughout the series of observations. Still more complete mapping of the potential field at the surface is accomplished by the electrode arrangement represented in Fig. 3, following the general procedure just described.

I claim:

1. In a method of determining discontinuities in the materials below the earth's surface, the steps which comprise laying out more than two angularly spaced lines radiating from a common point on the earth's surface; placing grounded potential electrodes at points on each of said lines equidistant from said common point; placing grounded current electrodes at points on each of said lines equidistant from said common point but spaced from the locations of the potential electrodes; passing current through the earth between the two current electrodes located on two of said lines to produce a potential difference between the two potential electrodes located on said two lines, and determining the relation of said current to said potential; and subsequently passing current through the earth between the current electrode located on one of said two lines and the curved electrode located on a third one of said lines to produce a potential difference between the two potential electrodes located on the last-mentioned two lines, and determining the relation of the last-mentioned current to the last-mentioned potential.

2. The invention as set forth in claim 1, in which said lines radiating from a common point comprise three lines spaced 120° apart.

3. The invention as set forth in claim 1, in which said lines radiating from a common point comprise four lines spaced 90° apart.

JOHN JAY JAKOSKY.

---

CERTIFICATE OF CORRECTION.

Patent No. 2,138,818.  December 6, 1938.

JOHN JAY JAKOSKY.

It is hereby certified that error appears in the printed specification of the above numbered patent requiring correction as follows: Page 3, second column, line 39, claim 1, for the word "curved" read current; and that the said Letters Patent should be read with this correction therein that the same may conform to the record of the case in the Patent Office.

Signed and sealed this 31st day of January, A. D. 1939.

Henry Van Arsdale (Seal)  Acting Commissioner of Patents.